US012659066B2

(12) United States Patent (10) Patent No.: US 12,659,066 B2
Kanazawa et al. (45) Date of Patent: Jun. 16, 2026

(54) MULTI-CHANNEL OPTICAL MODULE

(71) Applicant: NTT, Inc., Tokyo (JP)

(72) Inventors: Shigeru Kanazawa, Musashino (JP);
Takahiko Shindo, Musashino (JP);
Meishin Chin, Musashino (JP);
Yasuhiko Nakanishi, Musashino (JP)

(73) Assignee: NTT, Inc., Tokyo (JP)

( * ) Notice: Subject to any disclaimer, the term of this
patent is extended or adjusted under 35
U.S.C. 154(b) by 271 days.

(21) Appl. No.: 18/570,827

(22) PCT Filed: Jun. 23, 2021

(86) PCT No.: PCT/JP2021/023814
§ 371 (c)(1),
(2) Date: Dec. 15, 2023

(87) PCT Pub. No.: WO2022/269810
PCT Pub. Date: Dec. 29, 2022

(65) Prior Publication Data
US 2024/0223297 A1 Jul. 4, 2024

(51) Int. Cl.
*H04J 14/02* (2006.01)
*H04B 10/564* (2013.01)

(52) U.S. Cl.
CPC ........ *H04J 14/0307* (2023.08); *H04B 10/564*
(2013.01); *H04J 14/0305* (2023.08)

(58) Field of Classification Search
CPC .... H04J 14/0307; H04J 14/0305; H04J 14/02;
H04B 10/564; H04B 10/40; H04B 10/50;
H04B 10/501; G02B 6/4204; G02B
6/4286; G02B 6/2938
See application file for complete search history.

(56) References Cited

U.S. PATENT DOCUMENTS

2016/0277116 A1* 9/2016 Hasegawa ............ G02B 6/4286
2016/0282174 A1* 9/2016 Hasegawa ............ G01J 1/0204

FOREIGN PATENT DOCUMENTS

JP 2016-181645 A 10/2016

OTHER PUBLICATIONS

Ken Tsuzuki et al., *Full C-Band Tunable DFB Laser Array Copackaged with InP Mach-Zehnder Modulator for DWDM Optical Communication Systems*, IEEE Journal of Selected Topics in Quantum Electronics, vol. 15, No. 3, May/Jun. 2009, pp. 521-527.
Lewis B. Aronson et al., *Transmitter Optical Subassembly for XFP Applications*, Electronic Components and Technology Conference, 2005, pp. 1058-1062.
Tadashi Murao, et al., *Integrated Spatial Optical System for Compact 28-GB/sx4-lane Transmitter Optical Subassemblies*, IEEE Photonics Technology Letters, vol. 26, No. 22, Nov. 15, 2014, pp. 2275-2278.

* cited by examiner

*Primary Examiner* — Hibret A Woldekidan
(74) *Attorney, Agent, or Firm* — Workman Nydegger

(57) ABSTRACT

Crosstalk between adjacent channels is suppressed when monitoring output power. A multi-channel optical module for multiplexing and outputting a plurality of wavelength channels, which includes a plurality of light sources each having a different wavelength, a plurality of collimator lenses coupled to an output of each of the plurality of light sources, a beam splitter coupled to an output of each of the plurality of collimator lenses, a plurality of monitor PDs for monitoring optical power branched from the beam splitter, and a shielding plate installed between the plurality of collimator lenses.

4 Claims, 5 Drawing Sheets

Fig. 4

MULTI-CHANNEL OPTICAL MODULE

TECHNICAL FIELD

The present invention relates to a multi-channel optical module, and more particularly to a multi-channel module which is a role as an optical transmitter in an optical communication system using a wavelength multiplex optical transmission system.

BACKGROUND ART

Conventionally, with an increase in communication traffic, a wavelength multiplex optical transmission system has been used to increase the transmission capacity of an optical communication system. In order to perform wavelength multiplex optical transmission, a light source is prepared for each wavelength channel, and output lights from a plurality of light sources are multiplexed by an optical multiplexer and output to an optical fiber. In the optical communication system, it is required to keep the optical intensity of an optical transmission signal constant, and in the wavelength multiplex optical transmission system, it is also necessary to keep the optical intensity of each wavelength channel constant. In view of this, a part of the optical transmission signal is branched to monitor the light intensity, and the light source is controlled so that the light intensity to be monitored becomes constant.

FIG. 1 shows an example of an optical transmitter for multiplexing four wavelengths, which is a conventional multi-channel optical module. Output lights from light source chips 11a to 11d each of which is mounted on each wavelength channel are input to an optical multiplexer 20 through collimator lenses 31a to 31d and multiplexed. The output of the optical multiplexer 20 is multiplexed with all wavelength channels as wavelength multiplexed light through a condenser lens 32 and is coupled to an optical fiber 41.

FIG. 2 shows an example of a light source of a conventional multi-channel optical module. In the light source, the light source chip 11 including a modulation light source part 16 and an optical amplification part 15 is mounted on a subcarrier 12, and a monitor PD 13 for monitoring a part of output light from the modulation light source part 16 is mounted on a rear end of the light source chip 11. The monitor PD 13 detects the light output power of each wavelength channel as a current value, and a control circuit 14 adjusts a current supply amount to the light source chip 11 so that the detected current value becomes constant. By such an optical output control (APC) circuit, the optical output power from each light source chip 11 can be made constant at all times (see, for example, Non Patent Literatures 2 and 3).

Thus, the configuration in which the monitor PD 13 is arranged at the rear end of the light source chip 11 can monitor the light output power proportional to the output light from the light source chip 11. However, it is impossible to accurately monitor the optical output power for each wavelength the wavelength multiplexed light is output.

FIG. 3 shows another example of a conventional multi-channel optical module. FIG. 3(a) shows a structure of a multiplexer viewed from a substrate plane, and FIG. 3(B) shows a structure of the multiplexer viewed from a substrate side. Output lights from light source chips 11a to 11d each of which is mounted on a light source for each wavelength channel are input to an optical multiplexer 20 through collimator lenses 31a to 31d and a beam splitter 51 and multiplexed. The output of the optical multiplexer 20 is multiplexed with all wavelength channels as wavelength multiplexed light through a condenser lens 32 and is coupled to an optical fiber 41 (see, for example, Non Patent Literature 1).

The output lights from the light source chips 11a to 11d are partially branched by a beam splitter 51 and monitored by monitors PD 53a to 54d. The outputs of the monitors PD 53a to 53d are input to the control circuit 14 of the light source, and the current supply amount to the light source chip 11 is adjusted so that the detected current value becomes constant. Thus, the configuration in which the monitor PD 53 is arranged on the output side of the light source chip 11 can accurately monitor the output from the optical amplification part 15 of the light source, but the loss of light occurs by the passing loss of the beam splitter 51.

In addition, the spread of the output beam from the light source chip 11 is large, and as shown by a thin line in FIG. 3(a), a light component which becomes collimated light and is input to the multiplexer, and as shown by a dotted line, a stray light component which does not contribute to the collimated light are output. Thus, the stray light component exceeding the effective diameter of the collimator lens 31 is mixed into the monitor PD 13 of the adjacent channel, and there is a problem that the crosstalk is generated.

CITATION LIST

Non Patent Literature

[NPL 1] K. Tsuzuki et. al., "Full C-Band Tunable DFB Laser Array Copackaged With InP Mach-Zehnder Modulator for DWDM Optical Communication Systems," Journal of selected topics in quantum electronics, vol. 15, No. 3, pp. 21-527, 2009

[NPL 2] L. B. Aronson et. al., "Transmitter Optical Subassembly for XFP Applications," ECTC2005, DOI: 10.1109ECTC.2005.1441402

[NPL 3] Tadashi Murao et al, "Integrated Spatial Optical System for Compact 28-Gb/s×4-lane Transmitter Optical Subassemblies", IEEE PHOTONICS TECHNOLOGY LETTERS, P. 2275 VOL. 26, No. 22, Nov. 15, 2014

SUMMARY OF INVENTION

An object of the present invention is to provide a multi-channel optical module that suppresses the crosstalk between adjacent channels when monitoring optical output power.

In order to achieve such an object, one embodiment is a multi-channel optical module for multiplexing and outputting a plurality of wavelength channels, which includes a plurality of light sources each having a different wavelength, a plurality of collimator lenses coupled to an output of each of the plurality of light sources, a beam splitter coupled to an output of each of the plurality of collimator lenses, a plurality of monitor PDs for monitoring optical power branched from the beam splitter, and a shielding plate installed between the plurality of collimator lenses.

BRIEF DESCRIPTION OF DRAWINGS

FIG. 4 is a diagram showing a multi-channel optical module according to example 1 of the present invention.

DESCRIPTION OF EMBODIMENTS

Figure 1:
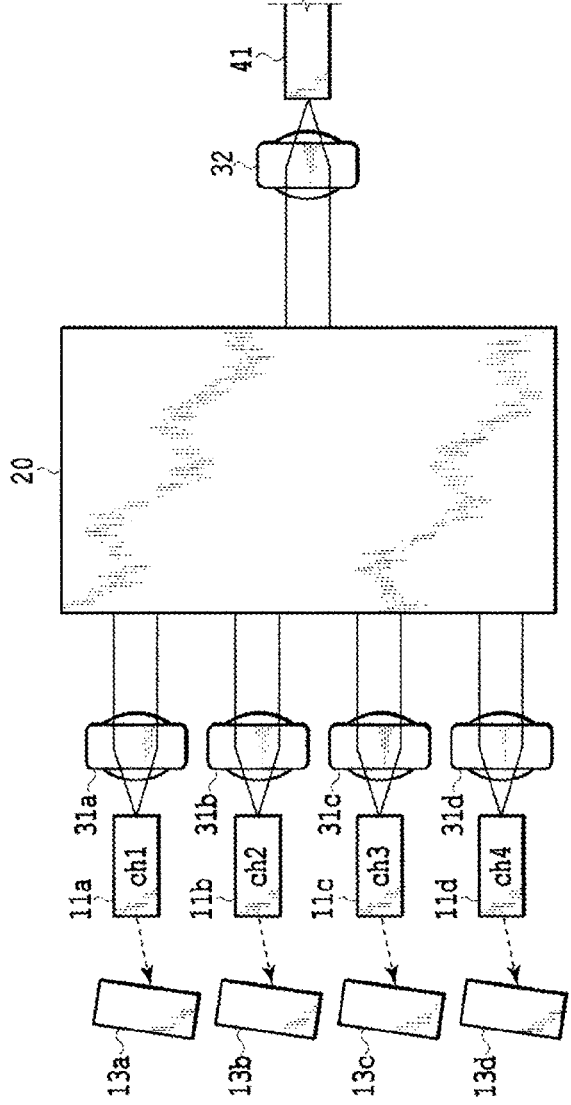
FIG. 1 is a diagram showing an example of a conventional multi-channel optical module.

Embodiments of the present invention will be described in detail below with reference to the drawings. In the present embodiment, a multi-channel optical module for multiplexing four wavelengths and outputting is described, but the number of wavelengths to be multiplexed is not limited.

Example 1

Figure 4:
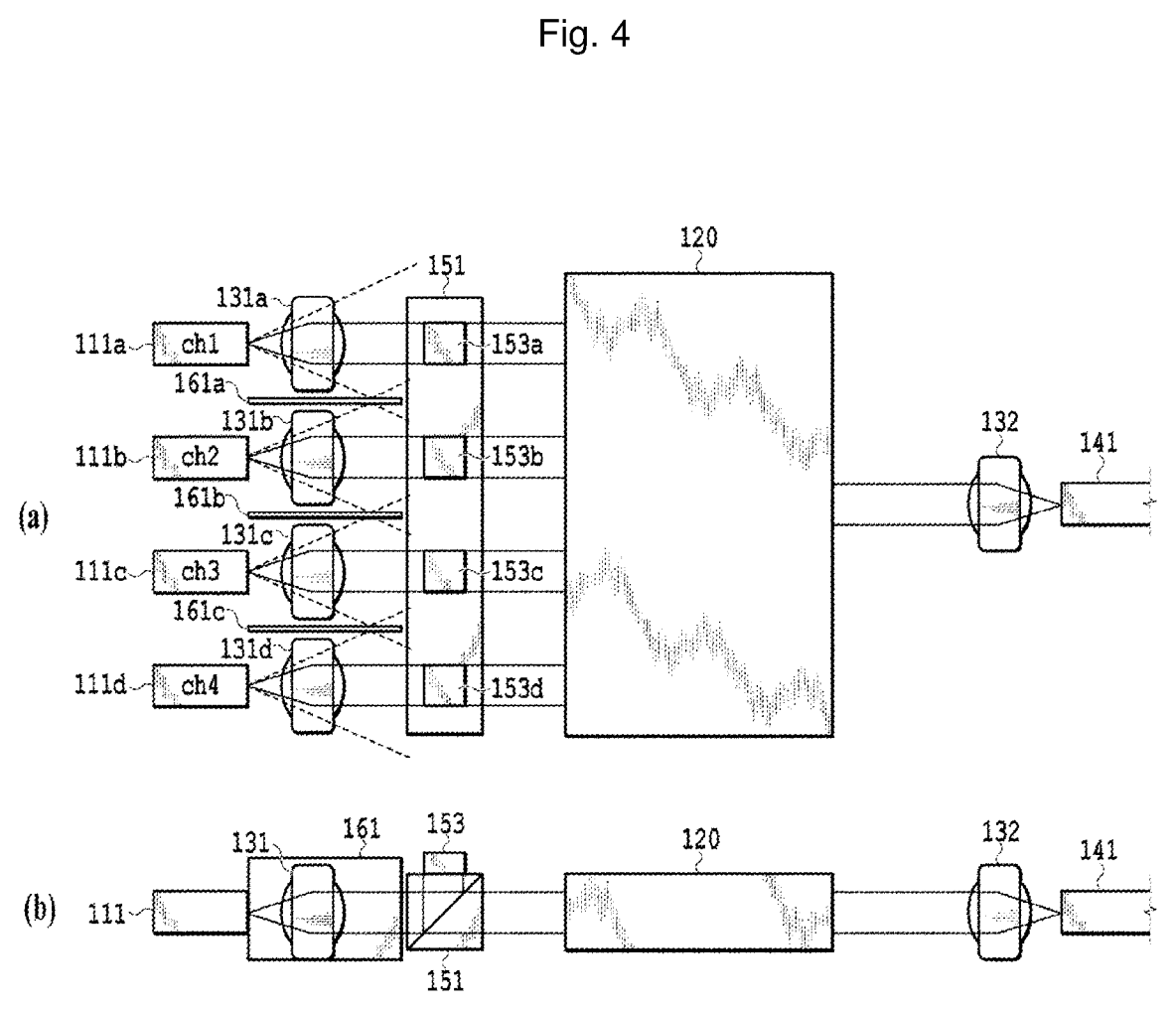

FIG. 4 shows an example of an optical transmitter for multiplexing four different wavelengths, which is a multi-channel optical module according to the first embodiment of the present invention. FIG. 4(*a*) shows a structure of a multiplexer viewed from a substrate plane, and FIG. 4(*b*) shows a structure of the multiplexer viewed from a substrate side. Output lights from the light sources 111*a* to 111*d* for each wavelength channel are input to an optical multiplexer 120 through collimator lenses 131*a* to 131*d* and a beam splitter 151 and multiplexed. The output of the optical multiplexer 120 is multiplexed with all wavelength channels as wavelength multiplexed light through a condenser lens 132 and is coupled to an optical fiber 141.

The output lights from the light source chips 111*a* to 111*d* are partially branched by the beam splitter 151, and an optical power of each output light is monitored by monitors PD 153*a* to 153*d*. The outputs of the monitor PDs 153*a* to 153*d* are input to a control circuit of the light source, and current supply amount to the light source chip 111 is adjusted so that the detected current value becomes constant, that is, the optical power of each output light becomes constant.

The beam splitter 151 may be, for example, a cube type in which slopes of two right-angle prisms are coupled with each other with an optical thin film interposed therebetween. The example 1 has an integrated structure in which four channels can be branched collectively.

Further, shielding plates 161*a* to 161*c* are installed between the collimator lenses 131*a* to 131*d* of each wavelength channel. The shielding plate 161 is made of a ceramic substrate, and is higher than a height of the collimator lens 131 and the beam splitter 151 as shown in FIG. 4(*b*). A reflection film or a light shielding film may be formed on the side surface of the shielding plate 161. Further, another material may be used as the shielding plate 161, as long as it shields light.

For example, the output light from the light source chip 111*a* passes through the collimator lens 131*a* to become collimated light as shown by a thin line in FIG. 4(*a*) and is input to the optical multiplexer 120 through the beam splitter 151. On the other hand, as shown by a dotted line, a stray light component exceeding the effective diameter of the collimator lens 131*a* is reflected or blocked by the shielding plate 161*a* and does not reach the adjacent channel. Therefore, since the stray light component is not coupled to the monitor PD 153*b* of the adjacent channel, the crosstalk between the adjacent channels when monitoring the optical output power can be suppressed.

After the multi-channel optical module of the example 1 was assembled as the optical transmitter, the output of the light source chip 111 of each wavelength channel was set to be +4 dBm, and the current value detected by the monitor PD 153 was measured when only single wavelength channel was operated. The current values of the wavelength channels 1 to 4 were 104, 101, 101, 100 μA, respectively. Next, the current values detected by the monitor PD 153 were measured when the four channels were simultaneously operated, then 105, 102, 101 and 101 μA were obtained, respectively.

Figure 2:
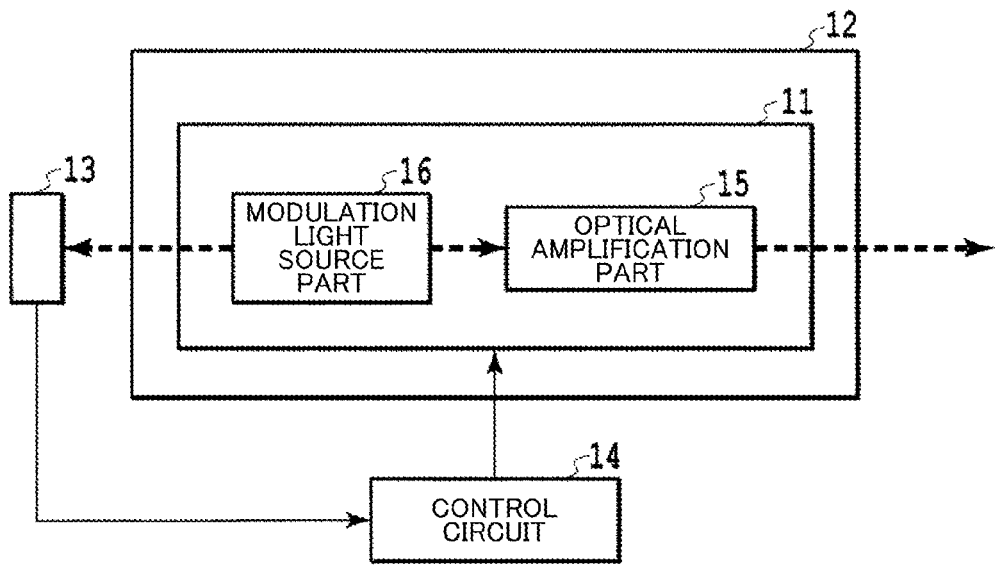
FIG. 2 is a diagram showing an example of a light source of the conventional multi-channel optical module.
Figure 3:
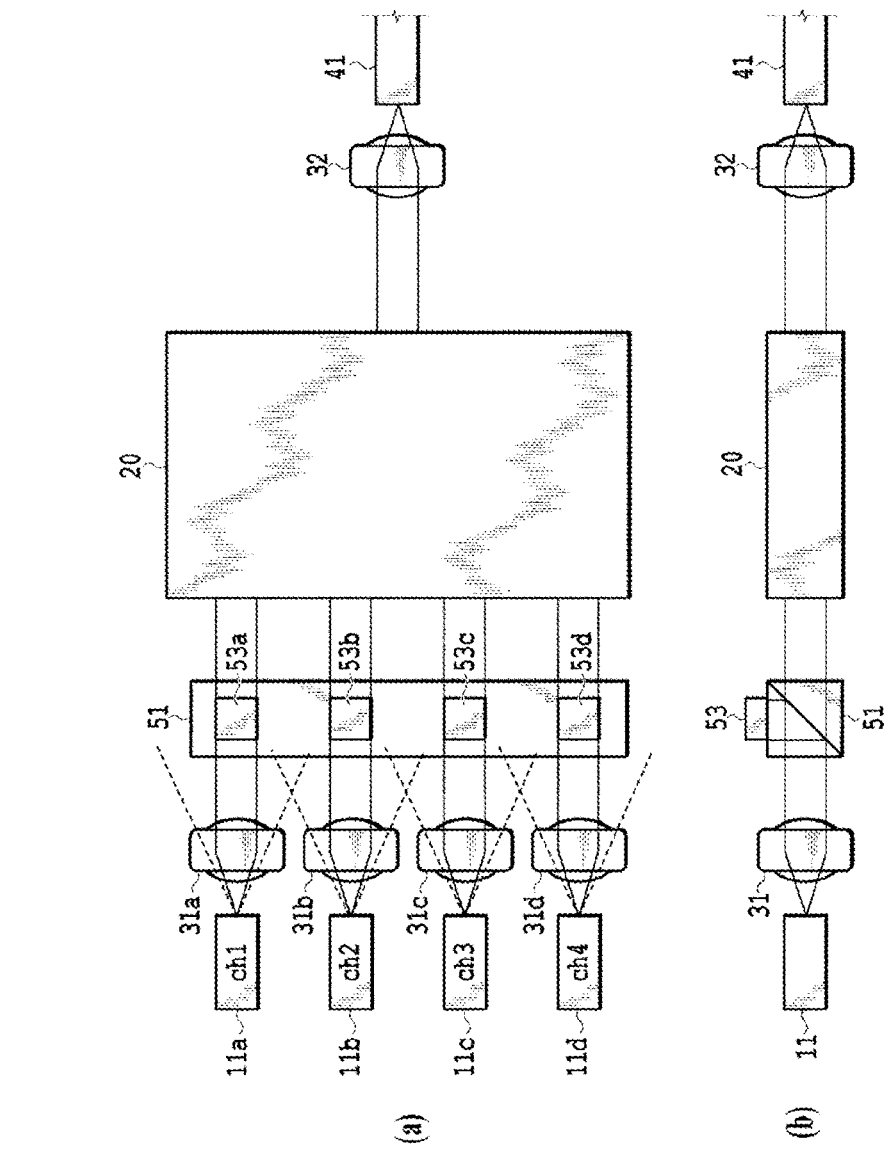
FIG. 3 is a diagram showing another example of the conventional multi-channel optical module.

For comparison, the same measurement was also performed in the conventional optical transmitter shown in FIG. 2. The output of the light source chip 11 of each wavelength channel was set to be +4 dBm, and the current values of the monitor PD 53 were 105, 103, 101, and 99 μA respectively when only single wavelength channel was operated. Next, the current values detected by the monitor PD 53 were measured when the four channels were simultaneously operated, then 115, 113, 112, and 110 μA were obtained, respectively.

In the conventional example, the current values are simultaneously operated are greater by 10, 10, 11, 11 μA respectively, when four channels than when a single wavelength channel is operated, and it is understood that it is affected by the crosstalk. On the other hand, according to the example 1, the change in the current value when the single wavelength channel was operated and when the four channels were simultaneously operated is small as 1, 1, 0, and 1 μA, and it is understood that the crosstalk between adjacent channels is suppressed.

Example 2

Figure 5:
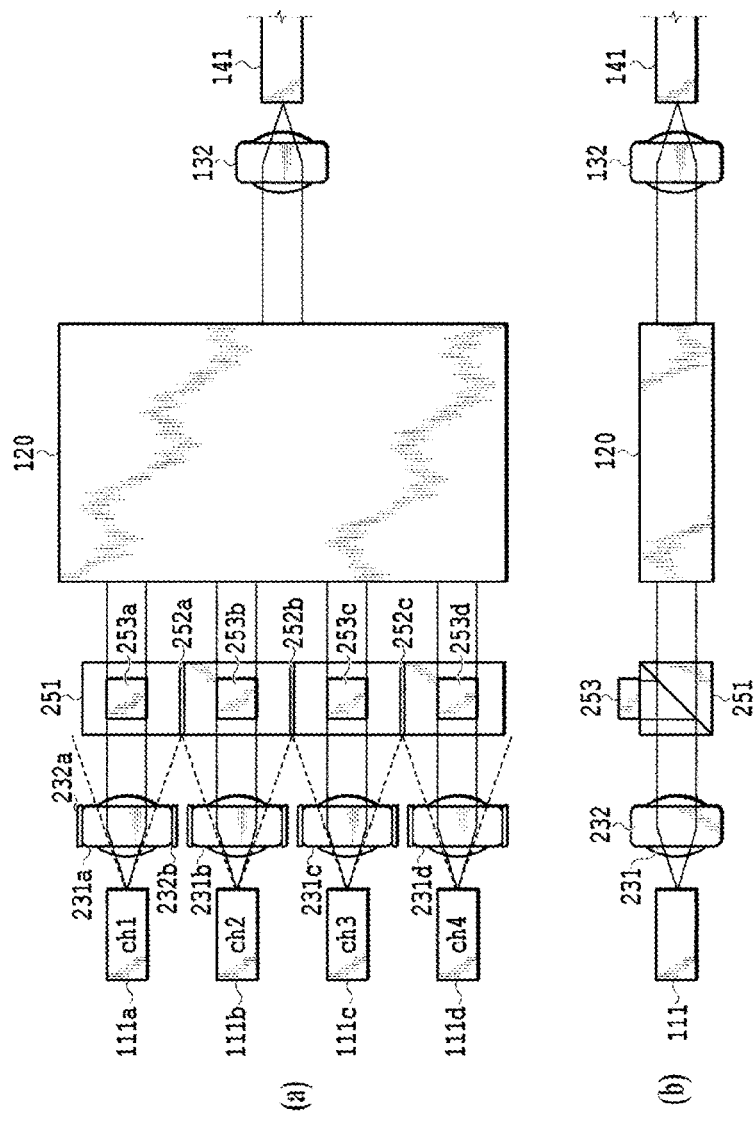
FIG. 5 is a diagram showing a multi-channel optical transmitter according to example 2 of the present invention.

FIG. 5 shows an example of an optical transmitter for multiplexing four different wavelengths, which is a multi-channel optical module according to the example 2 of the present invention. FIG. 5(*a*) shows a structure of a multiplexer viewed from a substrate plane, and FIG. 5(*b*) shows a structure of the multiplexer viewed from a substrate side. Output lights from the light sources 111*a* to 111*d* for each wavelength channel are input to an optical multiplexer 120 through collimator lenses 231*a* to 231*d* and a beam splitter 251 and multiplexed. The output of the optical multiplexer 120 is multiplexed with all wavelength channels as a wavelength multiplexed light through a condenser lens 132 and is coupled to an optical fiber 141.

The output lights from the light source chips 111*a* to 111*d* are partially branched by the beam splitter 251, and the optical power of each output light is monitored by monitors PD 253*a* to 253*d*. The outputs of the monitor PDs 253*a* to 253*d* are input to a control circuit of the light source, and current supply amount to the light source chip 111 is adjusted so that the detected current value becomes constant, that is, the optical power of each output light becomes constant.

The beam splitter 251 may be, for example, a cube type in which slopes of two right-angle prisms are coupled with each other with an optical thin film interposed therebetween. The difference from the beam splitter 151 of the example 1 is that shielding plates 252*a* to 252*c* are integrated in the beam splitter 251. The shielding plate 252 is installed between the monitor PDs 253*a* to 253*d* of each wavelength channel and in the optical path of the light sources 111*a* to 111*d* coupled through the collimator lenses 231*a* to 231*d* so as to divide the optical thin film. For example, the beam splitter 251 may be divided for each wavelength channel, and joined via a metal film serving as the shielding plate 252. Alternatively, a groove may be formed at the beam splitter 251, and the shielding plate 252 made of a ceramic substrate may be inserted therein. At this time, a reflection film or a light shielding film may be formed on the side surface of the shielding plate 252.

In addition, shielding plates 232a and 232b are installed on the side faces of the lens holders of the collimator lenses 231a to 231d of the wavelength channels. Each of the shielding plates 232 is made of a metal film. Other materials may be used as the shielding plate 232 as long as shielding light, for example, ceramic substrates may be joined. In the example 2, the shielding plates 232 and 252 are provided on both the lens holder and the beam splitter 251, but only one of them may be used.

As with the example 1, the stray light component exceeding the effective diameter of the collimator lens 231a is reflected or shielded by the shielding plates 232a and 232b, and the leakage to the adjacent channel is suppressed. In addition, the stray light component is reflected or blocked by the shielding plate 252a and is not coupled to the monitor PD 253b of the adjacent channel. Therefore, the crosstalk between adjacent channels when monitoring the optical output power can be suppressed.

After the multi-channel optical module of the example 2 was assembled as the optical transmitter, the output of the light source chip 111 of each wavelength channel was set to be +5 dBm, and the current values detected by the monitor PD 253 were measured when only single wavelength channel was operated. The current values of the wavelength channels 1 to 4 were 124, 121, 121 and 121 μA, respectively. Next, the current values detected by the monitor PD 253 were measured when the four channels were simultaneously operated, then 125, 122, 121, and 121 μA were obtained, respectively.

For comparison, the same measurement was also performed in the conventional optical transmitter shown in FIG. 2. The output of the light source chip 11 of each wavelength channel was set to be +5 dBm, and the current values of the monitor PD 53 were 125, 123, 121, and 119 μA, respectively when only single wavelength channel were operated. Next, the current values detected by the monitor PD 53 were measured when the four channels were simultaneously operated, then 136, 133, 132, and 130 μA was obtained, respectively.

In the conventional example, the current values are greater by 11, 10, 11, and 11 μA respectively when the four channels are simultaneously operated than when only single channel is operated, and it is understood that it is affected by the crosstalk. On the other hand, according to the example 2, the change in the current value when the single wavelength channel is operated and when the four channels are simultaneously operated is small as 1, 1, 0, and 0 μA, and it is understood that the crosstalk between adjacent channels is suppressed.

The invention claimed is:

1. A multi-channel optical module for multiplexing and outputting a plurality of wavelength channels, comprising:
   a plurality of light sources each having a different wavelength;
   a plurality of collimator lenses coupled to an output of each of the plurality of light sources;
   a beam splitter coupled to an output of each of the plurality of collimator lenses;
   a plurality of monitor PDs for monitoring optical power branched from the beam splitter; and
   a shielding plate integrated in the beam splitter and installed in an optical path of the light source coupled through each of the collimator lenses and configured to divide an optical thin film of the beam splitter.

2. The multichannel optical module according to claim 1, wherein the shielding plate is a metal film.

3. The multi-channel optical module according to claim 1, wherein
   a reflecting film or a light shielding film is formed on a side surface of the shielding plate.

4. The multi-channel optical module according to claim 1, wherein the shielding plate is higher than a height of the beam splitter.

* * * * *